Nov. 27, 1956

T. A. RICH 2,772,397

LOGARITHMIC ELECTRICAL MEASURING SYSTEM

Filed April 7, 1952

INVENTOR.
Theodore A. Rich
BY
Schmitt
Walter S. Paul
Attorneys

United States Patent Office 2,772,397
Patented Nov. 27, 1956

2,772,397

LOGARITHMIC ELECTRICAL MEASURING SYSTEM

Theodore A. Rich, Schenectady, N. Y., assignor, by mesne assignments, to the United States of America as represented by the Secretary of the Navy Application April 7, 1952, Serial No. 280,883

3 Claims. (Cl. 324—99)

This invention relates to measuring apparatus and more particularly to a direct current metering system in which deflection of the meter needle is proportional to the logarithm of the input current. This deflection is converted into an output current which varies as the logarithm of the input current. The output current may be used to energize any desired load.

The conventional direct current metering apparatus normally comprises a core mounted between the north and south poles of a permanent magnet. A coil is wound on a frame which is rotatably mounted on a shaft extending through the longitudinal axis of the core. The frame and coil longitudinally encircle the core. An indicating needle is mounted on the shaft. When a predetermined current input is supplied to the coil the flux set up therein coacts with the magnetic field of said magnets and causes a deflection of the coil and needle. The amount of deflection is dependent upon the current supplied to the coil. Where the coil deflection is directly proportional to the current input thereto, the accuracy of the reading is within approximately ±2% of the scale over which the coil deflects. Therefore for a scale of 1 to 1000 milliamperes, a low value of, for example, one milliampere is accurate to ±2% of one thousand. As the reading increases the percentage accuracy increases but the absolute error remains the same.

Prior art metering apparatus have been designed to receive a given current and supply an indication which approximates the logarithm of that current. In this manner the reading is accurate to within ±2% of the reading rather than ±2% of the scale values. These prior art devices accomplish this by shaping the poles of the permanent magnet to provide a flux variation in a desired fashion with angular deflection of the indicator. However, such devices are characterized by a number of disadvantages and limitations. They do not have sufficient versatility and cannot cover a range of three decades, for example, 1 to 1000.

In devices where it is necessary to measure a range of three decades it is essential that the same precision be obtained over the entire range. For example, in a device for determining the level of radioactivity at a given location, the amount of current supplied from the radiation detector may very well vary over a range of three decades. The same demands may be required in various components of a computing device.

An object of the present invention therefore is to provide a new and improved measuring apparatus which employs both electrical and mechanical elements to receive a given direct current input and furnish an amplified output current proportional to the logarithm of said input, the range of currents capable of being received extending through three decades.

Another object of the invention is to furnish as an element of said measuring apparatus a meter having specially shaped pole pieces on opposite sides of a core which has the conventional coil mounted thereon, there being further provided specially shaped concentric shield members associated with said poles and mounted on said core.

A further object of the invention is to furnish said meter with a pointer which carries a metallic flag at the end thereof, said flag being mounted to swing through a small ferrite C-shaped core carried by a second instrument which is co-axial with said meter. A coil carried by said core is connected into an electronic relay which drives said second instrument so that it accurately follows the meter.

Other objects and advantages will become apparent after a consideration of the following specification when taken in connection with the accompanying drawings, in which.

Figure 1:
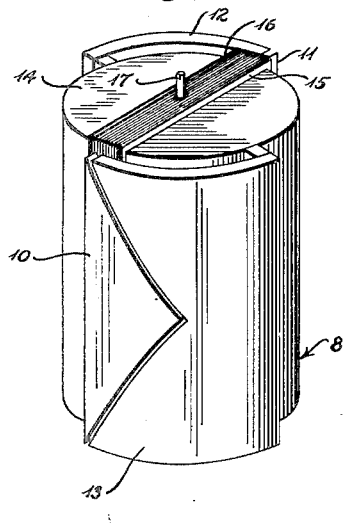
Fig. 1 is a perspective view of a suitable arrangement and shaping of field magnets of one of the meters utilized and constructed according to the present invention.

Reference is now made to the drawings for a more complete understanding of the invention, and more particularly to Fig. 1 thereof which shows the meter element. Wedge shaped elements 10 and 11 are the north and south pole pieces of a permanent magnet, the connection between the pole pieces being deleted for purposes of clarity. Cylinder 14 is a conventional core and is mounted between said pole pieces. A longitudinally extending shaft 17 extends through said core and is fashioned to rotatably mount a coil frame 15 having a coil 16 wound thereon, said coil and frame being constructed to longitudinally encircle said core. In addition, core 14 carries two concentric pieces of iron 12 and 13. A portion of each piece of iron is cut out in such a manner as to receive in complementary fashion the apex and adjacent edges of an associated pole piece. The positioning is such that an air gap separates the associated elements. By this construction elements 12 and 13 shield the moving coil 16 on frame 15 by varying amounts as the coil deflects.

When a given direct current is supplied to coil 16 a certain amount of deflection of the coil occurs. As the current input increases the coil deflection increases. However, elements 12 and 13 shield the moving coil by varying amounts as the coil deflects. Therefore, by proper shaping of the pole piece and the iron shield associated therewith a varying field is produced. As the current input increases, it takes more and more current to deflect the coil a given amount, this being necessary to overcome the effect of the shield. In this manner coil 16 deflects angularly an amount equivalent to the logarithm of the input current.

In covering three decades the first decade may be started at 10% below the nominal scale zero. At about 30 degrees the second decade may be started and the flux cut by the moving coil reduced to approximately 43% of nominal value. By 60 degrees the flux may be reduced to 7.6%. By 90 degrees, which may be the end of the third decade, the flux may be reduced to about 1.1% of its nominal value. By shaping the shield and pole piece, a good approximation to a log curve is obtained with possibly some slight bending from the ideal response as shown by the dotted curve in Fig. 4.

Figure 2:
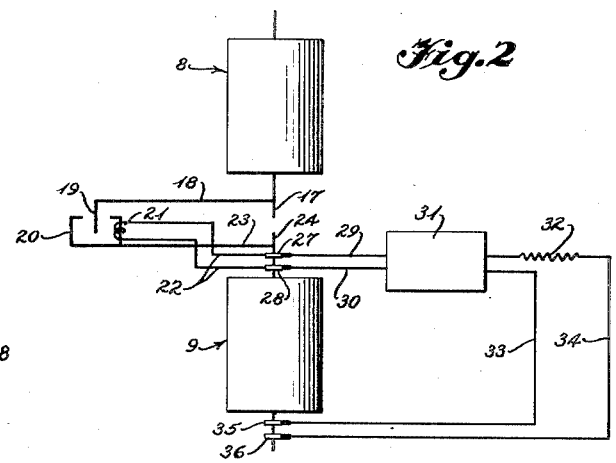
Fig. 2 is a schematic diagram of the apparatus embodying the invention.
Figure 5:
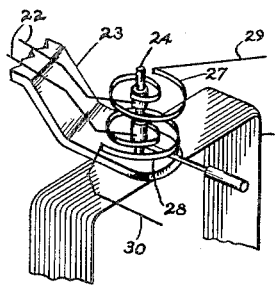
Fig. 5 shows one form of take-off devices for transferring an energy output from a movable part.

This meter or log instrument generally designated by the reference numeral 8 is observed, Fig. 2, to have coaxially mounted therewith a second instrument generally designated by the reference numeral 9, and which may be of conventional design, or may depart therefrom if desired. For example, instrument 9 may include a core positioned between opposite poles of a permanent magnet, there being the usual deflection coil rotatably mounted on the longitudinal axis of the core. With a given supply of current into said coil the coil is deflected a predetermined amount, the arrangement being such that the coil moves linearly with a linear increase in current. Secured to shaft 17 of meter 8 is an arm or pointer 18, the latter having a metallic flag 19 on the outer end thereof. This flag is non-magnetic to prevent the introduction of torque on the instrument due to local magnetic fields. The flag is adapted to swing through a small ferrite C-shaped magnetic core 20, said core being mounted on the outer end of an indicator arm 23 which is secured to shaft 24 of instrument 9. Shaft 24 is adapted to move with the deflection coil 58 in instrument 9. A coil 21 is wound around core 20, and is connected by leads 22 to take-off devices 27 and 28 mounted on shaft 24. These take-off devices may take the form of a pair of oppositely wound conducting coil springs, with one lead being connected to each spring, as shown in Fig. 5. It is understood that the devices could also take the form of slip rings or any other conventional device for performing the required function. From take-off devices 27 and 28 leads 29 and 30 connect to the input of an amplifier 31, presently to be more fully described. The output of the amplifier is connected by way of resistor 32 (which may comprise any suitable load such as a recorder or the like) and leads 33 and 34 to similar take-off devices 35 and 36 and thence to the deflection coil 58 of instrument 9.

Figure 3:
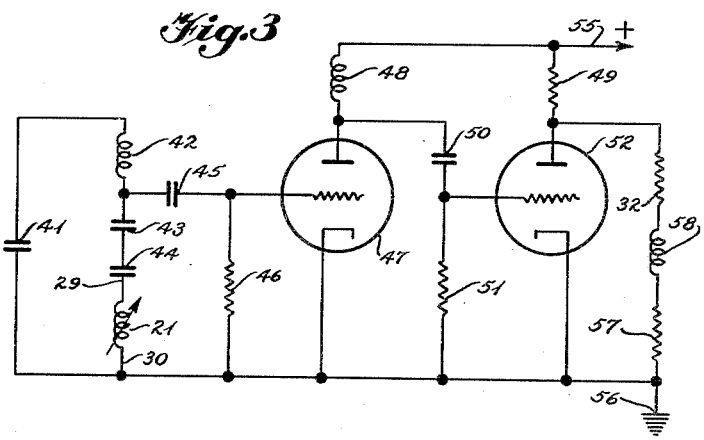
Fig. 3 is a schematic electrical circuit diagram of an amplifier suitable for use in the apparatus of Fig. 2.

The amplifier circuit of 31 is shown in schematic form in Fig. 3 and is in the form of an oscillator in which the amplitude of oscillation is controlled by the size of the inductance of coil 21. The frequency of oscillation is quite high, being in the order of 100 kilocycles, and has been used as high as a few megacycles. When the flag enters the field of coil 21, eddy currents introduced in it change the effective inductance which in turn changes the amplitude of oscillation. Aforementioned coil 21 is connected in series with capacitors 44, 43 and 45, connected in series in the order named, between the control grid and cathode of a suitable triode tube 47. An inductor 42 and capacitor 41, connected in series, are connected between the aforementioned cathode and the junction between capacitors 43 and 45. A resistor 46 is connected between the aforementioned grid and cathode, the latter being connected to ground 56.

The anode of tube 47 is connected by way of inductor 48 and lead 55 to the positive terminal of a suitable source of potential, not shown, which may have the negative terminal thereof connected to ground. The anode of tube 47 is also connected by way of capacitor 50 to the control grid of a triode amplifier 52, the grid of the second triode also being connected by way of resistor 51 to ground 56. The cathode of the second tube is connected to ground. The anode of tube 52 is connected by way of resistor or load 32 to one terminal of deflection winding 58 in instrument 9 and which has the other terminal thereof connected by way of resistor 57 to ground 56. If desired, a source of potential, not shown, may be connected between ground and the junction between inductor 58 and resistor 32.

Figure 4:
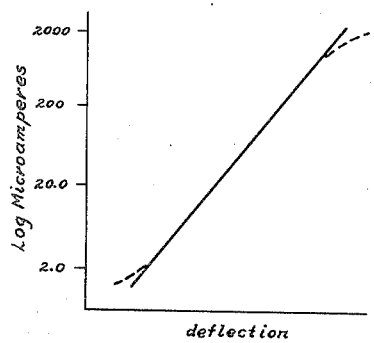
Fig. 4 is a graph illustrating the operation of the apparatus of Fig. 2.

In the operation of the above-described apparatus, input current is supplied to coil 16 of meter 8. Due to the specially designed pole pieces and their associated shield pieces, the output movement of arm 18 is a function of the logarithm of the input current. When the non-magnetic flag is between the opposite poles of the C-shaped magnet, eddy currents decrease the effective inductance of the coil, thus maintaining a predetermined output of current to the linear deflection coil 58. As arm 18 swings, it moves slightly from its position between the opposite poles of core 20, thus changing the effective inductance in coil 21. This change in inductance is supplied through take-off devices 27 and 28 to amplifier 31 where the amplitude of oscillation is changed. The amplifier then supplies the increased intensity current through take-off devices 35 and 36 to the coil 58 of instrument 9. Thus indicator arm 23 is made to accurately follow arm 18. At this point, since instrument 9 has a linear response, the amount of current passing through the coil thereof to hold it in its displaced position is proportional to the lagarithm of the current passing through the coil of the meter 8. As will be obvious, the current which passes through coil 58 also passes through resistor or load 32 which is connected in series therewith. Thus, there is provided a system which produces an output current which is proportional to the logarithm of the input current. As will be obvious, the output current may be utilized to energize any desired load. Fig. 4 illustrates the logarithmic response of meter 8. Because there may be some departure at the beginning and end of the log characteristics of instrument 8 as shown by the dotted portion of Fig. 4, the linear response of instrument 9 may be slightly modified in such a way as to make the current through 9 a strict log function of the current through 8.

With a metering apparatus such as the present invention, a very sensitive and light-weight metering element can be used. The arm and metallic flag are also delicate. By using the second instrument, which is provided with an indicator needle controlled in its movement by the movement of the flag, a very sensitive indicating instrument is obtained.

The system of the invention provides an output current which is proportional to the logarithm of the input current to meter 8. To provide extreme accuracy even at the scale ends, as seen in Fig. 4, the adjustment of the shape of pieces 12 and 13 shown in Fig. 1 becomes quite critical. The output of the amplifier shown in Fig. 2 depends equally upon the scale law of logarithmic instrument 8 and linear instrument 9. If the overall output departs slightly from a true logarithmic response, then it is possible to make minor changes in the linear instrument, such as by making minor changes in the air gap.

In the above discussion it has been assumed that a linear torque spring, not shown, is employed. If desired, nin-linear control torque may be employed, such as that obtainable through magnetic control means, not shown.

Obviously many modifications and variations of the present invention are possible in the light of the above teachings. It is therefore to be understood that within the scope of the appended claims the invention may be practiced otherwise than as specifically described.

What is claimed is:

1. A system for measuring the magnitude of an electrical input and simultaneously producing an electrical output which is proportional to the logarithm of said electrical input comprising a logarithmic galvanometer having a first rotatable shaft, a metallic flag carried by said first shaft adapted to be deflected an amount which is approximately proportional to the logarithm of said electrical input, a second galvanometer having a second rotatable shaft axially aligned with said first shaft, a coil mounted on said second shaft proximate to said flag, follow-up means coupled to said coil for producing an electrical output in response to the movement of said flag relative to said coil which is of the proper magnitude to cause said second galvanometer to deflect its shaft by an amount necessary to cause the coil to maintain its same relative position with respect to said flag, and means to adjust the response characteristic of said second galvanometer, said electrical output thereby being proportional to the logarithm of said electrical input.

2. A device for measuring the magnitude of an electrical input and simultaneously producing an electrical output which is proportional to the logarithm of said electrical input comprising a logarithmic galvanometer having a first deflection coil having a first shaft affixed thereto, means connecting said first deflection coil to receive said electrical input, said first galvanometer having pole pieces constructed so that said first coil and said first shaft will deflect an amount which is approximately proportional to the logarithm of said electrical input, a metallic non-magnetic flag operatively affixed to said first shaft for rotation therewith, a second galvanometer having a second deflection coil, a second shaft affixed to said second deflection coil, said second shaft being in axial alignment with said first shaft, an inductance coil operatively affixed to said second shaft, said inductance coil being positioned proximate to said metallic flag, means coupled to said inductance coil and to said second deflection coil for producing and applying to said second deflection coil an electrical output in response to the movement of said flag relative to said coil which is of the proper magnitude to cause said second galvanometer to deflect said second shaft by an amount necessary to cause said inductance coil to maintain its same relative position with respect to said flag, and means to adjust the response characteristic of said second galvanometer, said electrical output thereby being proportional to the logarithm of said electrical input.

3. A device for measuring the magnitude of an electrical input and simultaneously producing an electrical output which is proportional to the logarithm of said electrical input comprising a logarithmic meter having a first deflection coil for producing a deflection which is approximately proportional to the logarithm of said electrical input, a metallic flag carried by said first deflection coil, a second meter having a second deflection coil coaxial with said first deflection coil, a follow-up member carried by said second deflection coil, said follow-up member being positioned proximate to said metallic flag, and follow-up means coupled to said follow-up member and to said second meter for producing and applying to said second deflection coil an electrical output in response to the movement of said flag relative to said follow-up member which is of the proper magnitude to cause said second meter to deflect its deflection coil by an amount necessary to cause said follow-up member to maintain its same relative position with respect to said flag, and means to adjust the response characteristic of said second meter, said electrical output thereby being proportional to the logarithm of said electrical input.

References Cited in the file of this patent

UNITED STATES PATENTS

| | | |
|---|---|---|
| 2,458,731 | Rath | Jan. 11, 1949 |
| 2,527,797 | Cohen | Oct. 31, 1950 |
| 2,576,611 | Lang et al. | Nov. 27, 1951 |
| 2,664,531 | Nakasone | Dec. 29, 1953 |

FOREIGN PATENTS

| | | |
|---|---|---|
| 342,630 | Germany | Oct. 21, 1921 |
| 552,085 | Germany | June 9, 1932 |